Figure 1:
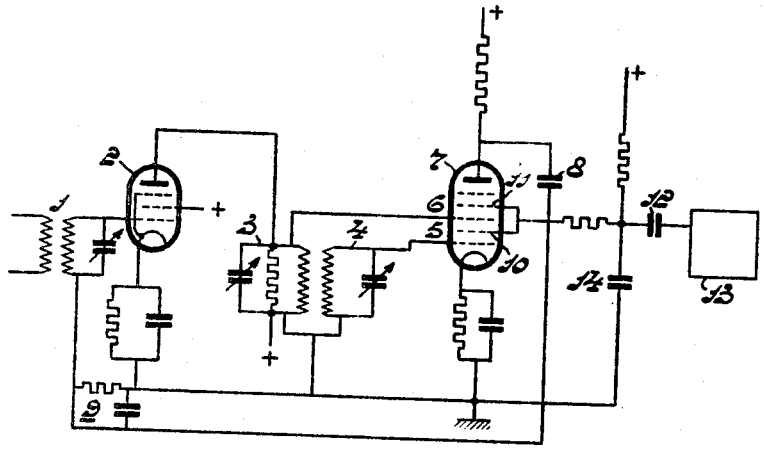

Dec. 8, 1953

G. HEPP 2,662,179

CIRCUIT-ARRANGEMENT FOR RECEIVING AND DETECTING
FREQUENCY MODULATED OSCILLATIONS

Filed Dec. 23, 1947

INVENTOR
GERARD HEPP
BY
AGENT

Patented Dec. 8, 1953

2,662,179

UNITED STATES PATENT OFFICE 2,662,179

CIRCUIT-ARRANGEMENT FOR RECEIVING AND DETECTING FREQUENCY MODULATED OSCILLATIONS

Gerard Hepp, Eindhoven, Netherlands, assignor to Hartford National Bank and Trust Company, Hartford, Conn., as trustee Application December 23, 1947, Serial No. 793,496
In the Netherlands December 4, 1946

Section 1, Public Law 690, August 8, 1946
Patent expires December 4, 1966

15 Claims. (Cl. 250—27)

In conventional circuit-arrangements for receiving and detecting frequency-modulated oscillations these oscillations are fed, subsequent to mixing, to a limiter in which undue amplitude-modulation of these oscillations is obviated, after which the limited oscillations, only subjected to frequency-modulation, are detected by means of a frequency detector and the detected oscillations are fed to the low-frequency stage of the receiver.

A disadvantage of this circuit-arrangement, as compared with a circuit-arrangement for receiving and detecting amplitude-modulated oscillations, is that at least one supplementary tube, i. e. the limiter tube, but frequently, in addition, a supplementary amplifying tube, are required since material loss of amplification occurs in the limiter tube.

In a known circuit-arrangement, in which the limiter tube may be dispensed with, the oscillations to be detected are fed, together with oscillations from a local oscillator, to an amplitude detector, the output voltage of which controls the frequency-determining circuit of the local oscillator such that the frequency of the oscillations produced by this oscillator is, at any moment, substantially equal to the instantaneous frequency of the oscillations to be detected. Since the amplitude of the oscillations produced by the local oscillator is constant, the oscillations required to be fed to the frequency detector may be derived therefrom. Even this circuit-arrangement comprises a considerably larger number of circuit elements, notably more tubes, than a circuit-arrangement for receiving and detecting amplitude-modulated oscillations.

The invention relates to a circuit-arrangement for receiving and detecting frequency-modulated oscillations, in which amplitude-modulation of these oscillations is inoperative, so that the limiter tube may be dispensed with, whilst in contradistinction to prior arrangements, the circuit-arrangement according to the invention, requires few more circuit-elements than a circuit-arrangement for receiving amplitude-modulated oscillations.

With reference to one embodiment of the invention it will be shown that with the use of very few supplementary circuit-elements a receiver may be adapted in a very simple manner to detect both frequency- and amplitude-modulated oscillations.

For this purpose, in a receiving circuit-arrangement for frequency-modulated oscillations comprising at least one modulator and one frequency-detector the oscillations required to be detected are modulated, according to the invention, in the said modulator and then fed to the frequency-detector, across the output circuit of which a voltage is produced which, in the absence of modulation in the said modulator, varies with the instantaneous frequency as well as with the amplitude of the oscillations to be detected, and which, if necessary after amplification, is fed as a modulating voltage to the said modulator, the arrangement being such that undue amplitude modulations of the oscillations to be detected is reduced, whilst the detected oscillations are obtained by rectification from a voltage which is proportional to the voltage produced across the input circuit of the frequency-detector.

Figures 1A, 1B:
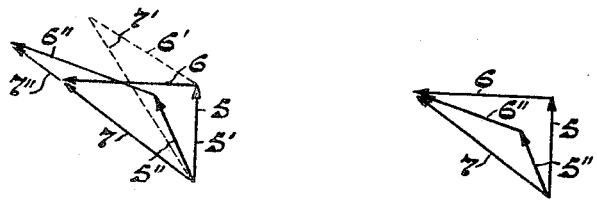
Figure 2:
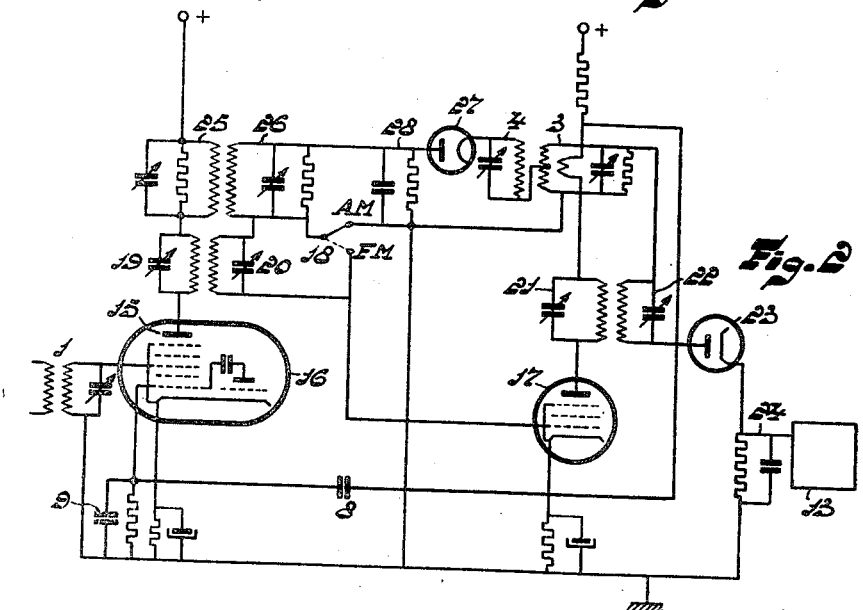

In order that the invention may be more clearly understood and readily carried into effect, it will now be described more fully with reference to the accompanying drawing, in which embodiments of the invention are shown, by way of example, and in which Fig. 1 relates to a circuit-arrangement for an intermediate frequency amplifier which also serves as a modulator and to a mixing detector of a frequency-modulation receiving apparatus, whereas Figs. 1a and 1b are vector diagrams explaining the operation of Fig. 1, and Fig. 2 shows a circuit-arrangement for receiving both frequency- and amplitude-modulated oscillations.

Referring to Fig. 1, the frequency-modulated oscillations are fed, through an input transformer 1, to the control-grid of an intermediate-frequency amplifying tube 2. The oscillations set up across the anode circuit of this tube are fed to a discriminator network which may comprise, for example, two coupled circuits 3 and 4. These two circuits have produced across them two voltages which are supplied to the two control-grids 5 and 6 of a mixing tube 7, which is connected as a mixing detector, the phase-displacement between the said voltages varying with the instantaneous frequency of the input oscillations and being adjusted, for example for the central frequency of these oscillations, to 90°. Thus the anode circuit of the tube 7 has produced across it a voltage which may be resolved into a component having a frequency equal to that of the input oscillations, other components the frequency of which is equal to a higher harmonic of the frequency of the input oscillations and, finally, a low-frequency component. The amplitude of these intermediate-frequency components or the value of the low-frequency component respectively vary, in the absence of the modulation set out hereinafter, with both the instantaneous frequency and the amplitude of the input oscillations.

The invention is based on recognition of the following fact: If a voltage is produced the value of which is proportional to the amplitude of one of the said intermediate-frequency components, which, as a modulating voltage, controls itself the amplification of one of the preceding tubes or of the mixing tube itself respectively, this will result in a substantially constant amplitude of the said intermediate-frequency component, since a slight increase of this amplitude leads to a higher modulating voltage and, thus to a lower amplification, so that the first-mentioned increase is counteracted.

A similar effect is obtained by producing a modulating voltage the value of which is proportional to the value of the said low-frequency component. This low-frequency component is suppressed in this case by the said modulation.

In this case, however, the input circuit of the mixing detector 7 must have fed to it oscillations the amplitude modulation of which is proportional in such manner to the frequency sweep that this effect is produced.

The foregoing is more clearly explained with reference to the vector diagrams of Figs. 1a and 1b. In Fig. 1a 5 and 5' designate the voltage across the grid 5, and 6 and 6' the voltage supplied to grid 6 for two different values of the instantaneous frequency of the input oscillations. In this case in the absence of the said modulation, the low-frequency component of the anode voltage is proportional, to a first approximation, to the increase in length of the sum vector 7, consequently to the difference of the vectors 7' and 7. In order that the effect may be better understood, the vector triangle 5', 6', 7' is turned into the position 5'', 6'', 7'' so that the vector 7' coincides with the vector 7.

Owing to the said modulation of the tube 2, the length of the vector 7 will now be kept constant. The vector diagram associated therewith is shown in Fig. 1b. Since the ratio between the vectors 5'', 6'' and 7'' is constant, the vector 5'' of Fig. 1b will exhibit an amplitude-modulation which is inversely proportional to the amplitude-modulation of the vector 7'' of Fig. 1a and, consequently, to a first approximation, proportional to the frequency sweep of the input oscillations, but independent of the amplitude-modulation of these oscillations.

The recognition of this fact is realized as follows in the circuit-arrangement shown in Fig. 1. The low-frequency component of the anode voltage of the tube 7, which but for control varies in a low-frequency rhythm owing to the frequency sweep of the input oscillations, is caused, through a blocking condenser 8 and a filter 9 which does not allow the intermediate-frequency oscillations to pass, to be effective as a modulating voltage in the grid-circuit of the tube 2 so as to vary the amplification, more particularly the mutual conductance of this tube. Owing to this modulation, the amplitude of the oscillations set up across the output circuit of the tube 2 will have to vary in such manner with the instantaneous value of the frequency of the input oscillations that the low-frequency of the anode voltage of the tube 7 is substantially zero. However, according to the foregoing, the amplitude of the said oscillations is substantially independent of the amplitude modulation of the input oscillations, since if at a definite frequency the amplitude of these oscillations produced across the anode circuit of the tube 2 should be slightly increased, this would lead to an increase of the control-voltage and thus to a decrease in amplification of the tube 2.

The low-frequency voltage set up across the common circuit of the two screen-grids 10 and 11 of the tube 7 varies substantially only with the voltage supplied to the grid 5 of the tube 7, it varying linearly with the amplitude of this voltage, if provision is made of a condenser 14 which constitutes a small impedance for the frequency of the intermediate-frequency oscillations, but a high impedance for audio-frequencies. This screen-grid voltage is supplied, through the blocking condenser 12, to the low-frequency stage 13 of the receiver circuit.

It is obvious from the explanation given that, as an alternative, the modulating voltage may be derived for example by rectification, from the intermediate-frequency voltage produced across the anode circuit of the tube 7 or that the voltage to be fed to the low-frequency stage 13 may be derived by rectification from the intermediate-frequency voltage produced across the common circuit of the two screen-grids, and so forth.

The circuit-arrangement shown in Fig. 2 comprises a high-frequency mixing tube 15, a local oscillator 16 and an intermediate-frequency amplifying tube 17 for a receiving circuit for frequency- and amplitude-modulated oscillations, this circuit-arrangement comprising the same number of tubes for the two kinds of modulation.

If the switch 18 occupies the position AM, the intermediate-frequency oscillations produced across the anode circuit of the mixing tube 15 are supplied, through the circuits 19 and 20 tuned to the intermediate frequency of the amplitude modulation (for example 475 kcs.), to the control-grid of the intermediate-frequency amplifying tube 17, are amplified in this tube and then supplied, through the circuits 21 and 22 also tuned to this frequency, to the amplitude-detector 23 with its smoothing filter 24. Thus in this position of the switch the amplitude-modulated, high-frequency oscillations supplied to the input transformer are amplified and detected in the usual manner.

If the switch 18 occupies the position FM, the intermediate-frequency oscillations produced across the anode circuit of the mixing tube 15 are supplied, through the circuits 25 and 26, which are tuned to the intermediate frequency for frequency-modulation (for example to 2 mcs.) and allow a wider frequency band to pass than the circuits 19 and 20, to the control-grid of the intermediate-frequency amplifying tube 17, are amplified in this tube and then supplied, through the discriminator network 3,4 to a detector 27 with its smoothing filter 28. Apart from the modulation to be set out hereinafter, the voltage produced across this smoothing filter 28 is proportional to the frequency sweep of the input oscillations. This voltage is supplied, similar to the above-mentioned intermediate-frequency oscillations, to the control-grid of the tube 17 and amplified in this tube, as far as low-frequency currents are concerned, after which the amplified voltage is supplied through the blocking condenser 8 to the input circuit of the tube 15 and determines the amplification, more particularly the mutual conductance of this tube.

In this position of the switch 18, frequency-modulated oscillations supplied to the input transformer 1 will, in accordance with the foregoing explanation, set up amplitude-modulated amplified intermediate-frequency oscillations across the circuit 3, the amplitude-modulation of which is proportional to the frequency sweep of the incoming oscillations, but independent of the amplitude-modulation of these oscillations, these amplitude-modulated oscillations being detected with the aid of the detector 23 and its smoothing filter 24 and supplied to the low-frequency stage 13.

What I claim is:

1. A circuit arrangement for detecting a frequency modulated wave having frequency deviations proportional to amplitude variations of a modulating signal wave, comprising a transmission path having a variable amplification, means to apply said frequency modulated wave to said transmission path, means to derive from said transmission path a second frequency modulated wave having frequency deviations and amplitude variations varying with variations of said signal wave, first rectifying means to derive from said second frequency modulated wave a control potential having amplitude variations proportional to the frequency deviations and the amplitude variations of said second frequency modulated wave, means to apply said control potential to said transmission path to vary the amplification thereof proportional to the amplitude variations of said control potential, and second rectifying means to derive said signal wave from said second frequency modulated wave.

2. A circuit arrangement for detecting a frequency modulated wave having frequency deviations proportional to amplitude variations of a modulating signal wave, comprising a transmission path having a variable amplification, means to apply said frequency modulated wave to said transmission path, means to derive from said transmission path a second frequency modulated wave having frequency deviations proportional to the amplitude variations of said signal wave and having amplitude variations, frequency responsive means coupled to said transmission path for producing first and second voltages having a phase relationship proportional to the frequency deviations of said second frequency modulated wave, mixing means to combine said first and second voltages to produce a control potential having amplitude variations proportional to the frequency deviations and the amplitude variations of said second frequency modulated wave, means to apply said control potential to said transmission path to vary the amplification thereof proportional to the amplitude variations of said control potential, and means to derive said signal wave from said second frequency modulated wave.

3. A circuit arrangement for detecting a frequency modulated wave having frequency deviations proportional to amplitude variations of a modulating signal wave, comprising a transmission path having a variable amplification, means to apply said frequency modulated wave to said transmission path, means to derive from said transmission path a second frequency modulated wave having frequency deviations proportional to the amplitude variations of said signal wave and having amplitude variations, frequency responsive means coupled to said transmission path for producing first and second voltages having a phase relationship proportional to the frequency deviations of said second frequency modulated wave, mixing means to combine said first and second voltages to produce a control potential having amplitude variations proportional to the frequency deviations and the amplitude variations of said second frequency modulated wave, means to apply said control potential to said transmission path to vary the amplification thereof proportional to the amplitude variations of said control potential, and means to derive an output potential having amplitude variations proportional to the amplitude variations of said second frequency modulated wave.

4. A circuit arrangement for detecting a frequency modulated wave having frequency deviations proportional to amplitude variations of a modulating signal wave, comprising a transmission path having a variable amplification, and including an electron discharge tube having a cathode, a grid and an anode, means to apply said frequency modulated wave to said grid, frequency responsive means coupled to said anode for producing first and second voltages having a phase relationship proportional to the frequency deviations of said frequency modulated wave, a second discharge tube having a cathode, first and second control grids, a screen grid interposed between said first and second grids and an anode, means to apply said first and second voltages to said first and second control grids, means to couple the anode of said second tube to the grid of said first tube, low pass means arranged in said latter coupling means, and means coupled to said screen grid to derive an output potential having amplitude variations proportional to the amplitude variations of said signal wave.

5. A circuit arrangement for detecting a frequency modulated wave having frequency deviations proportional to amplitude variations of a modulating signal wave, comprising a transmission path having a variable amplification, means to apply said frequency modulated wave to said transmission path, means to derive from said transmission path a second frequency modulated wave having frequency deviations proportional to the amplitude variations of said signal wave and having amplitude variations, a discharge tube having a cathode, a control grid and an anode, means to apply said second frequency modulated wave to said control grid, an impedance element coupled to said anode, frequency and amplitude responsive means coupled to said anode to produce a control potential having amplitude variations proportional to the frequency deviations and the amplitude variations of said second frequency modulated wave, means to apply said control potential to said transmission path to vary the amplification thereof proportional to the amplitude variations of said control potential, and detector means coupled to said impedance to derive said signal wave from said second frequency modulated wave.

6. An electrical circuit arrangement for detecting a modulation component of an applied wave, comprising a first discharge tube having a cathode, a control grid and an anode, means to apply said wave to said discharge tube, first and second resonance means connected in series and coupled to said anode, a second discharge tube having a cathode, a control grid coupled to said resonance means and an anode, a first impedance element and a frequency responsive network coupled to the anode of said second tube, diode detector means coupled to said impedance element, second diode detector means coupled to said frequency responsive network, means to couple the output of said second diode detector means to the control grid of said first discharge tube, and switching means selectively shunting the output of said second diode detecting means and one of said resonance means.

7. A circuit arrangement for detecting a frequency modulated wave having frequency deviations proportional to amplitude variations of a modulating signal wave, comprising an amplitude modulator, means to apply said frequency modulated wave to said amplitude modulator, means to derive from said amplitude modulator a second frequency modulated wave having frequency deviations proportional to the amplitude variations of said signal wave and having amplitude variations, a frequency detector, means intercoupling said amplitude modulator and said frequency detector in cascade relationship to apply said second frequency modulated wave to said frequency detector, means to derive from said frequency detector a control potential having amplitude variations proportional to the frequency deviations and the amplitude variations of said second frequency modulated wave, means to apply said control potential to said amplitude modulator to amplitude modulate said first frequency modulated wave, and rectifier means to derive said signal wave from said second frequency modulated wave.

8. A receiver for the reception of an angle modulated signal comprising: means constituting an amplifying channel having substantially uniform transmission characteristics over a band of frequencies including the frequencies of said signal; a frequency selective automatic gain control system having different transmission characteristics at each frequency in said band; means applying the output of said channel to the input of said system; means applying the output of said system to modulate the gain of said channel as a function of the angle modulation of said signal; and an amplitude responsive detector receiving the output of said channel.

9. A receiver for the reception of an angle modulated signal comprising: means constituting an amplifying channel having substantially uniform transmission characteristics over a band of frequencies including the frequencies of said signal; means varying the gain of said amplifying means as a function of the angle modulation of said signal; and means recovering the envelope of the resulting amplitude modulated signal.

10. A receiver for the reception of an angle modulated signal comprising: means constituting an amplifying channel having substantially uniform transmission characteristics over a band of frequencies including the frequencies of said signal; means varying the gain of said amplifying means as a function of the angle modulation of said signal and inversely with variations of the amplitude of said signal; and means recovering the envelope of the resulting amplitude modulated signal.

11. The method of receiving an angle modulated signal which comprises: submitting the said signal to amplification uniformly over the range of frequencies encompassed thereby; submitting said amplified signal to frequency selective amplification which varies linearly through said range of frequencies; utilizing said frequency selectively amplified signal to modulate the said uniform amplification as a function of the frequency of said signal; and recovering the envelope of the resulting amplitude modulated signal.

12. The method of receiving an angle modulated signal which comprises: submitting the said signal to amplification uniformly over the range of frequencies encompassed thereby; submitting said amplified signal to amplification which varies as a function of the frequency thereof; utilizing the product of said frequency varied amplification to modulate the said uniform amplification; and recovering the envelope of the resulting amplitude modulated signal.

13. The method of receiving an angle modulated signal which comprises: submitting the said signal to amplification uniformly over the range of frequencies encompassed thereby; submitting said amplified signal to frequency detection; applying the product of said frequency detection to modulate the said uniform amplification and recovering the envelope of the resulting amplitude modulated signal.

14. The method of receiving an angle modulated signal which comprises: submitting the said signal to amplification uniformly over the range of frequencies encompassed thereby; recovering from said signal so amplified a voltage varying in amplitude with said angle modulation and varying inversely with amplitude variations of said signal; modulating said uniform amplification with said voltage; and recovering the envelope of the resulting amplitude modulated signal.

15. The method receiving an angle modulated signal which comprises: submitting the said signal to amplification uniformly over the range of frequencies encompassed thereby; submitting said amplified signal to amplification which varies as a function of the frequency thereof; recovering the envelope of the product of said frequency varied amplification; modulating said uniform amplification with said envelope; and recovering the envelope of the resulting amplitude modulated signal.

GERARD HEPP.

References Cited in the file of this patent

UNITED STATES PATENTS

| Number | Name | Date |
|---|---|---|
| 2,261,286 | Rankin | Nov. 4, 1941 |
| 2,282,910 | Thompson | May 2, 1942 |
| 2,351,240 | Trevor | June 13, 1944 |
| 2,354,959 | McCoy | Aug. 1, 1944 |
| 2,445,996 | Bradley | July 27, 1948 |
| 2,472,301 | Koch | June 7, 1949 |
| 2,483,195 | Goldberg | Sept. 27, 1949 |